United States Patent
Koestner et al.

(10) Patent No.: US 10,381,653 B2
(45) Date of Patent: Aug. 13, 2019

(54) PEMFC ELECTRODE MUDCRACK MITIGATION AT LOW PT LOADING

(71) Applicant: GM GLOBAL TECHNOLOGY OPERATIONS LLC, Detroit, MI (US)

(72) Inventors: Roland J. Koestner, Webster, NY (US); Swaminatha P. Kumaraguru, Rochester Hills, MI (US); Irina A. Kozhinova, Penfield, NY (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 89 days.

(21) Appl. No.: 15/447,667

(22) Filed: Mar. 2, 2017

(65) Prior Publication Data

US 2018/0254489 A1   Sep. 6, 2018

(51) Int. Cl.
| | | |
|---|---|---|
| *H01M 4/92* | (2006.01) | |
| *H01M 4/86* | (2006.01) | |
| *H01M 8/1004* | (2016.01) | |
| *H01M 4/88* | (2006.01) | |
| *H01M 8/1039* | (2016.01) | |
| *H01M 8/1041* | (2016.01) | |
| *H01M 8/1018* | (2016.01) | |

(52) U.S. Cl.
CPC ....... *H01M 4/8668* (2013.01); *H01M 4/8605* (2013.01); *H01M 4/8803* (2013.01); *H01M 4/8807* (2013.01); *H01M 4/921* (2013.01); *H01M 4/925* (2013.01); *H01M 8/1004* (2013.01); *H01M 8/1039* (2013.01); *H01M 8/1041* (2013.01); *H01M 2008/1095* (2013.01)

(58) Field of Classification Search
CPC .. H01M 4/925; H01M 4/8668; H01M 4/8605; H01M 4/921; H01M 4/8803; H01M 4/8807; H01M 8/1004; H01M 8/1039; H01M 8/1041
USPC ................... 429/492, 493, 494, 535
See application file for complete search history.

(56) References Cited

U.S. PATENT DOCUMENTS

| | | | | |
|---|---|---|---|---|
| 7,169,500 | B2 * | 1/2007 | Kim ............... | H01M 4/8605 429/482 |
| 8,293,671 | B2 * | 10/2012 | Yamamoto ............ | B01J 23/40 429/524 |
| 9,012,346 | B2 * | 4/2015 | Houghtaling ....... | H01M 4/8828 502/101 |
| 9,065,140 | B2 * | 6/2015 | Houghtaling ....... | H01M 4/8663 |
| 9,722,269 | B2 * | 8/2017 | Moose ............... | H01M 8/1004 |
| 9,868,804 | B1 * | 1/2018 | Fuller ............... | D01D 5/00 |
| 2005/0043487 | A1 * | 2/2005 | Felix ............... | C08J 5/2237 525/199 |
| 2005/0053822 | A1 * | 3/2005 | Miyake ............ | C08J 5/2281 429/483 |
| 2005/0130006 | A1 * | 6/2005 | Hoshi ............... | C08F 16/30 429/442 |
| 2006/0110631 | A1 * | 5/2006 | Olmeijer ........... | H01M 4/8605 429/483 |

(Continued)

*Primary Examiner* — Amanda C. Walke
(74) *Attorney, Agent, or Firm* — Reising Ethington P.C.

(57) ABSTRACT

An electrode ink composition that forms a fuel cell catalyst layer with reduced mudcracking is provided. The ink composition includes a solvent, a platinum group metal-containing catalyst composition dispersed in the solvent, a primary polymer dispersed within the solvent, the primary polymer being an ionomer, and a secondary polymer dispersed within the solvent, the secondary polymer interacting with the primary polymer via a non-covalent interaction.

10 Claims, 9 Drawing Sheets

(56) References Cited

U.S. PATENT DOCUMENTS

| | | | | |
|---|---|---|---|---|
| 2008/0160351 | A1* | 7/2008 | Felix | C08J 3/05 |
| | | | | 429/483 |
| 2008/0161429 | A1* | 7/2008 | Felix | C08J 3/122 |
| | | | | 521/28 |
| 2010/0297523 | A1* | 11/2010 | Merlo | C08J 5/2237 |
| | | | | 429/483 |
| 2011/0003071 | A1* | 1/2011 | Uensal | B01J 31/0284 |
| | | | | 427/58 |
| 2013/0040222 | A1* | 2/2013 | Kim | H01M 8/1018 |
| | | | | 429/482 |
| 2013/0142946 | A1* | 6/2013 | Houghtaling | C09D 11/10 |
| | | | | 427/115 |
| 2013/0157169 | A1* | 6/2013 | Madden | H01M 4/8652 |
| | | | | 429/482 |
| 2013/0202986 | A1* | 8/2013 | Moose | H01M 8/1004 |
| | | | | 429/482 |
| 2013/0244135 | A1* | 9/2013 | Yamane | C08J 5/2206 |
| | | | | 429/482 |
| 2014/0329167 | A1* | 11/2014 | Okanishi | H01M 8/0291 |
| | | | | 429/490 |
| 2015/0051064 | A1* | 2/2015 | Tong | H01M 8/1011 |
| | | | | 502/159 |
| 2016/0301092 | A1* | 10/2016 | Kim | H01M 8/1051 |
| 2017/0033369 | A1* | 2/2017 | Burton | C25B 11/0489 |
| 2017/0338496 | A1* | 11/2017 | Takahashi | H01M 4/92 |
| 2018/0248198 | A1* | 8/2018 | Yadav | H01M 4/8878 |

* cited by examiner (1)

Aspen Technology's US 10,381,653 B2

PEMFC ELECTRODE MUDCRACK MITIGATION AT LOW PT LOADING

TECHNICAL FIELD

In at least one aspect, the present invention is related to fuel cell membranes with improved durability, and in particular, to fuel cell membranes in which mudcracking is mitigated.

BACKGROUND

The electrode layer in proton exchange fuel cells (PE-FC's) is typically coated from an ink that includes a Pt or Pt-alloy catalyst dispersed on a carbon black support, a perfluorosulfonic acid ionomer (PFSA) and alcohol-water solvent. The carbon black support provides gas transport for reactants to the catalyst and product water to the flow channel, while the PFSA ionomer provides proton conduction to the catalyst as well as binding of the porous carbon network[1].

Through-layer cracks, however, can develop during solvent drying of the coated ink film which directly impacts durability of the fabricated membrane-electrode assembly (MEA) during fuel cell operation[2]. As an example, FIG. 1 shows the polymer flow and resulting thickness reduction that occurs in a 25 μm thick NAFION® membrane at an electrode crack after humidity cycling. Cell failure occurs once a through-layer crack is formed in the separator membrane due to reactant gas leakage between anode and cathode layers.

The electrode layer has a high porosity at ~70% v/v for optimal gas transport that thereby carries a weak fracture resistance. As a result, the coated ink film is susceptible to through-layer crack formation during solvent drying. In addition to a uniform tensile stress derived from the solvent capillary pressure within the consolidated carbon black mesopore volume, a local tensile stress can also develop from uneven permeation of the ink ionomer solution into a porous coating substrate[3-9]. Both stresses are typically present when the electrode ink is coated directly on gas-diffusion-media (CCDM or catalyst-coating-on-diffusion-media) which then requires a mechanical reinforcement of the fragile carbon microstructure to avoid crack formation during solvent-drying.

Accordingly, there is a need for methods of improving fuel cell membranes by reducing the electrode mudcracking.

SUMMARY

The present invention solves one or more problems of the prior art by providing an electrode ink composition that forms fuel cell catalyst layers with reduced electrode mudcracking. The ink composition includes a solvent, a platinum group metal-containing catalyst composition dispersed in solvent, a primary ionomer in solution and a secondary polymer in solution whereby the secondary polymer interacts with the primary ionomer via a non-covalent interaction.

In another embodiment, a fuel cell that includes a catalyst layer formed from the ink composition set forth above is provided. The fuel cell includes an anode catalyst layer, a cathode catalyst layer, a proton conducting membrane interposed between the anode catalyst layer and the cathode catalyst layer, a first gas diffusion layer disposed over the anode catalyst layer, a second gas diffusion layer disposed over the cathode catalyst layer, an anode flow field plate disposed over the first gas diffusion layer and a cathode flow field plate disposed over the second gas diffusion layer. Characteristically, at least one of the anode catalyst layer and the cathode catalyst layer include a platinum group metal-containing catalyst composition, a primary ionomer and a secondary polymer which interacts with the primary ionomer via a non-covalent interaction in solution.

In at least one aspect, a method for reducing electrode mudcracking in a fuel cell is provided. In this regard, the gel point of the ionomer solution in the electrode ink is manipulated to provide mechanical reinforcement. The gel point is accelerated by blending the primary PFSA ionomer in solution with a secondary PFSA ionomer or other polymer that also provides a strong chain association through either hydrogen or ionic bonding. The secondary ionomer or polymer accelerates the consolidation or gel point of the ink solution during solvent drying. Both schemes are shown to provide the necessary mechanical reinforcement of the fragile carbon microstructure to avoid crack formation during the CCDM electrode fabrication process.

In one aspect, a secondary ionomer is selected with significant chain expansion and extension in a solution which is then blended with NAFION® to impose a strong chain association via hydrogen bonding (H-bond) of its more accessible sulfonic acid sites. In another aspect, a high molecular-weight polyvinyl-2-pyrrolidone (PVP) polymer is blended with NAFION® to drive a strong chain association via ionic bonding between the cationic ammonium and anionic sulfonate sites on each polymer.

DETAILED DESCRIPTION

Figure 1:
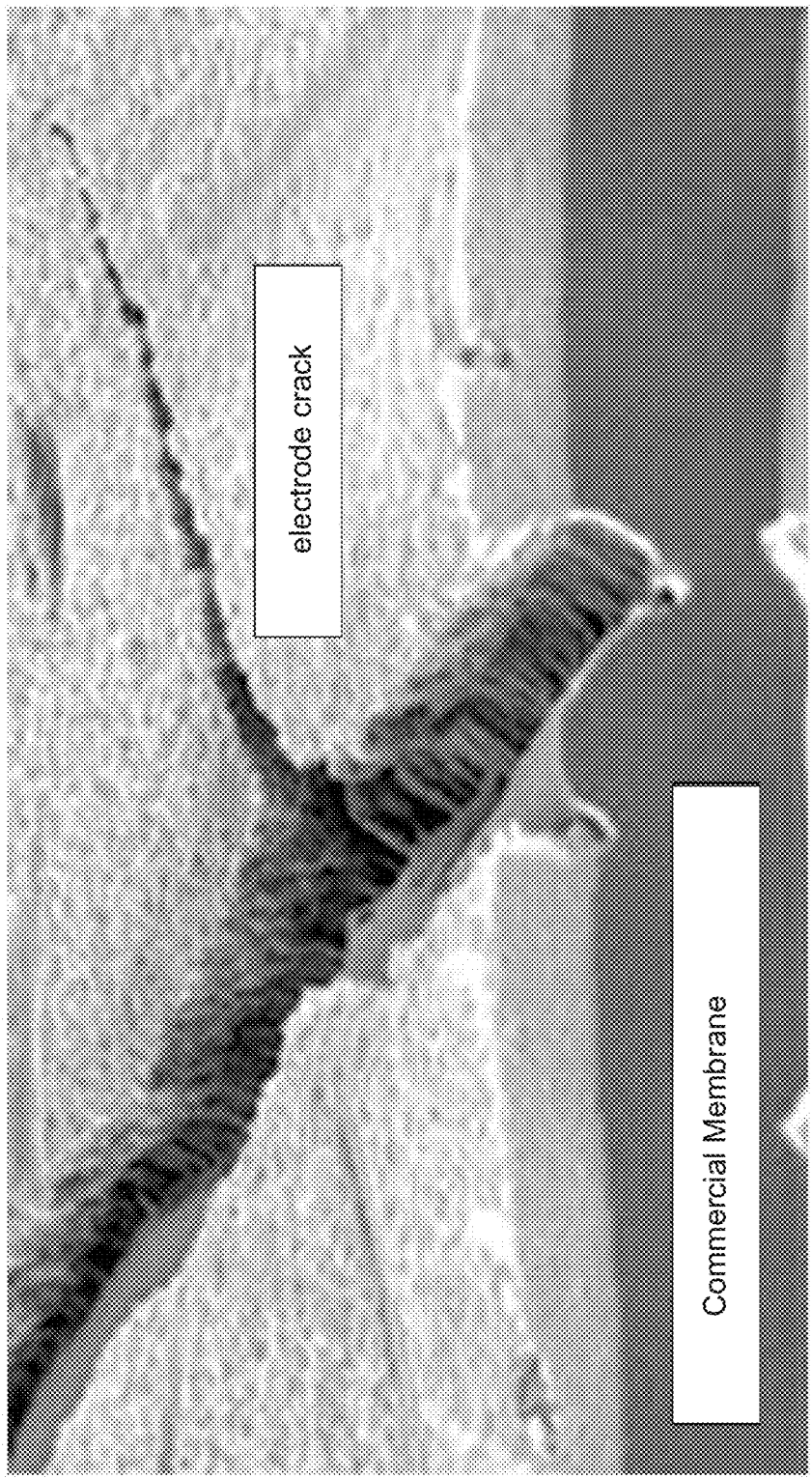
FIG. 1 provides a scanning electron micrograph showing polymer membrane flow at an electrode crack after humidity cycling.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this invention pertains.

Abbreviations:
"SSC" means short side chain.
"MSC" means mid-sized side chain.
"LSC" means long side chain.

Figure 2:
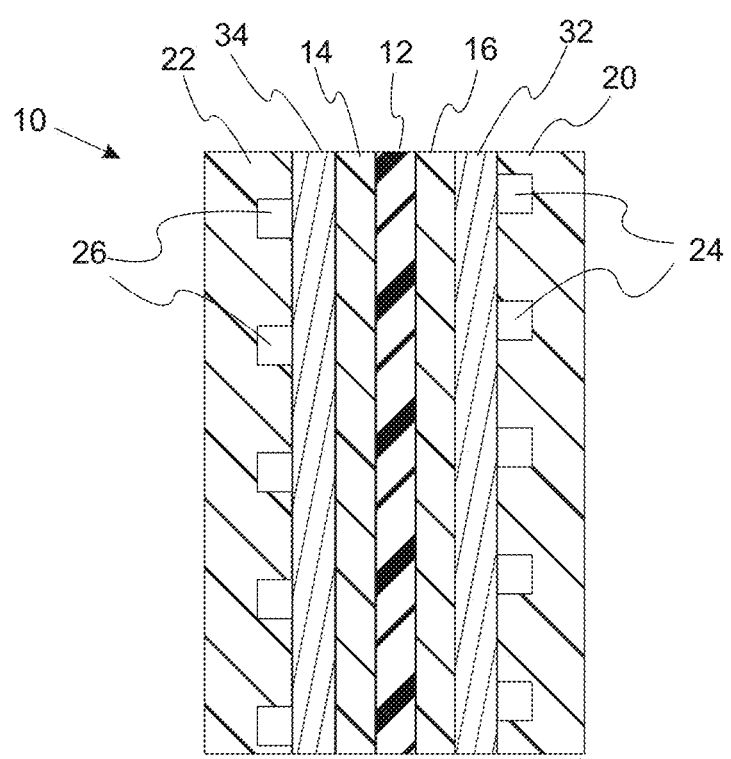
FIG. 2 provides a schematic illustration of a fuel cell incorporating catalyst layers with reduced mudcracking.

With reference to FIG. 2, an idealized schematic cross section of a fuel cell that incorporates catalyst layers having reduced electrode mudcracking is provided. PEM fuel cell 10 includes polymeric ion conducting membrane 12 disposed between cathode catalyst layer 14 and anode catalyst layer 16. Fuel cell 10 also includes electrically conductive flow field plates 20, 22 which include gas channels 24 and 26. Flow field plates 20, 22 are either bipolar plates (illustrated) or unipolar plates (i.e., end plates). In a refinement, flow field plates 20, 22 are formed from a metal plate (e.g., stainless steel) optionally coated with a precious metal such as gold or platinum. In another refinement, flow field plates 20, 22 are formed from conducting polymers which also are optionally coated with a precious metal. Gas diffusion layers 32 and 34 are also interposed between flow field plates and a catalyst layer. Cathode catalyst layer 14 and anode catalyst layer 16 include carbon supported catalysts made by the processes set forth below. Advantageously, at least one of cathode catalyst layer 14 and anode catalyst layer 16 are formed from the catalyst layer set forth below. In a refinement, cathode catalyst layer 14 is formed from this ink composition. In another non-exclusive refinement, anode catalyst layer 16 is formed from this ink composition.

In one embodiment, an electrode ink composition useful for forming the catalyst layers in a fuel cell with reduced electrode mudcracking is provided. The ink composition includes a solvent, a platinum group metal-containing catalyst composition dispersed in the solvent, a primary ionomer dispersed within the solvent and a secondary polymer dispersed within the solvent. The platinum group metal-containing catalyst composition includes a platinum group metal (e.g., Pt, Pd, Au, Ru, Ir, Rh, or Os), and in particular, platinum. In a refinement, the platinum group metal-containing catalyst composition includes an alloy of a platinum group metal and a transition metal (e.g., Co and/or Ni). Typically, the platinum group metal-containing catalyst composition includes a support (e.g., carbon particles) upon which the platinum group metal is disposed. In a refinement, the ink composition includes the platinum group metal-containing catalyst composition in an amount from about 1 weight percent to about 10 weight percent of the total weight of the ink composition. In a further refinement, the primary ionomer and secondary polymer are each independently present in an amount from about 1 weight percent to about 20 weight percent of the total weight of the ink composition. In another refinement, the primary ionomer and the secondary polymer are each independently present in an amount from about 2 weight percent of the about 10 weight percent to total weight of the ink composition. In some refinements, the amounts of the primary ionomer and secondary polymer are approximately equal. In still a further refinement, the ink composition includes the solvent in an amount from about 70 weight percent to about 97 weight percent of the total weight of the ink composition. Useful solvents include, but are not limited to, water, alcohols, (e.g., ethanol, propanol etc), combinations of water and alcohols, and the like. Characteristically, the secondary polymer interacts with the primary ionomer via a non-covalent interaction.

In one variation, the secondary polymer interacts with the primary ionomer via hydrogen bonding. In another variation, the secondary polymer interacts with the primary polymer via ionic bonding. In particular, the two variations utilize hydrogen or ionic bonding of a primary NAFION® ionomer with a secondary polymer. This blending scheme can be extended to other secondary polymers that have sufficient molecular weight ($M_w$, >250 kD), low overlap concentration ($c^*$<0.20% w/w in ethanol:water:1:1 w/w) and effective sites to associate with the sulfonate anion on a primary PFSA ionomer such as NAFION®.

In most refinements, the primary polymer is a perfluorosulfonic acid polymer (PFSA). A particularly useful primary polymer is provided by formulae I or II:

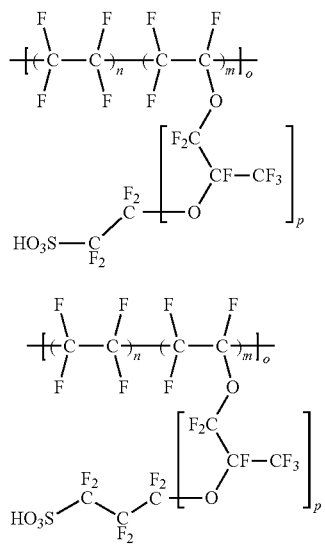

where n is on average from 1 to 10; m is 1, 2 or 3; o is on average from about 30 to 800; and p is 1, 2, or 3. In a refinement, n is about 5; m is 1; and o is on average from about 300 to 700.

Figure 3A:
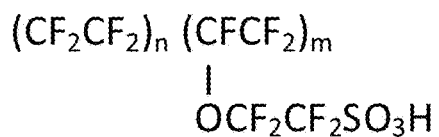
FIGS. 3A, 3B, 3C and 3D illustrates the chemical structure of commercial polymers used in this invention; A. SSC PFSA ionomer. B. MSC PFSA ionomer. C. NAFION® LSC PFSA ionomer. D. PVP homopolymer.
Figure 3B:
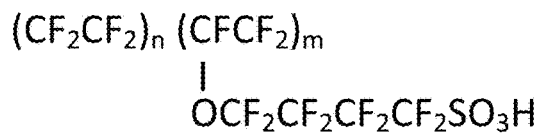
Figure 3C:
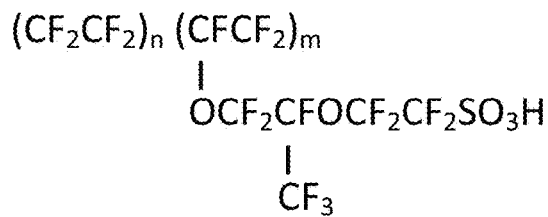

With respect to the variation that uses a hydrogen bonding interaction, secondary PFSA ionomers with a high chain expansion coefficient in alcohol-water solution and a high chain length are particularly useful in this application since they are durable in the fuel cell operating condition and contribute to the primary ionomer functions: namely, proton conduction to the Pt catalyst and binding in the electrode layer. Table 1 lists other commercial PFSA ionomers that are available to blend in the electrode ink solution, while FIGS. 3A-3C illustrates their chemical composition. For FIGS. 3A-C, n is on average from 1 to 10 and m is 1, 2 or 3. In commercially available examples of FIG. 3A, the equivalent weight is 720 g/mol with n=4.4 and m=1 or equivalent weight of 830 with n=5.5 and m=1. In commercially available examples of FIG. 3B, the equivalent weight is 825 g/mol with n=4.5 and m=1 or equivalent weight of 980 with n=6.0 and m=1. In commercially available examples of FIG. 3C, the equivalent weight is 950 g/mol with n=5.1 and m=1 or equivalent weight of 1050 with n=6.1 and m=1.

The primary and secondary polymers are characterized by their equivalent weights and molecular weights. The ionomer equivalent weight (EW) is defined as the polymer weight per mole sulfonic acid and is expressed in units of g/mol. The EW measurement releases the acidic hydrogen ion into 1N NaCl solution formulated at a 400-molar excess which is then titrated with 10.0+−0.1 mN NaOH solution using a Mettler-Toledo DL15 Autotitrator instrument. The ionomer weight-average molecular weight ($M_w$) and intrinsic viscosity ($\eta$) are measurer by Size Exclusion Chromatography (SEC). An Agilent 1100 series instrument is equipped with an isocratic pump, autosampler and two-wavelength spectrophotometric detector, an Agilent PD2020 two-angle LS (light scattering) detector, a Malvern Model 270 DV (viscomtery) detector and a Waters Corporation Model 410 DRI (refractive index) detector. The DV and DRI were in a parallel configuration after the spectrophotometric and LS detectors. Three Agilent Olexis 7.5×300 mm columns at 35.0° C. were used with N,N-dimethylformamide (DMF) containing 0.1 M LiNO3. The eluent was pre-filtered using 0.22 μm Millipore GS filters. The columns were calibrated with 15 polymethylmethacrylate (PMMA) narrow standards from Agilent with molar mass between 0.58 and 1,400 kDa. Injection volumes were 100 μL and the optimum injected sample concentration was 0.5-2.0 mg/mL. The wavelength of the LS detector laser diode was 680 nm. The specific refractive increment (dn/dc) of PMMA at 680 nm was estimated to be 0.062 mL/g. The peak area response factor of the DRI detector was calculated from PMMA narrow standards and the dn/dc values of perflourosulfonated ionomers were then estimated from their integrated DRI detector responses. The LS detector was calibrated with isotropically scattering PMMA standards of known molar mass.

Figure 3D:
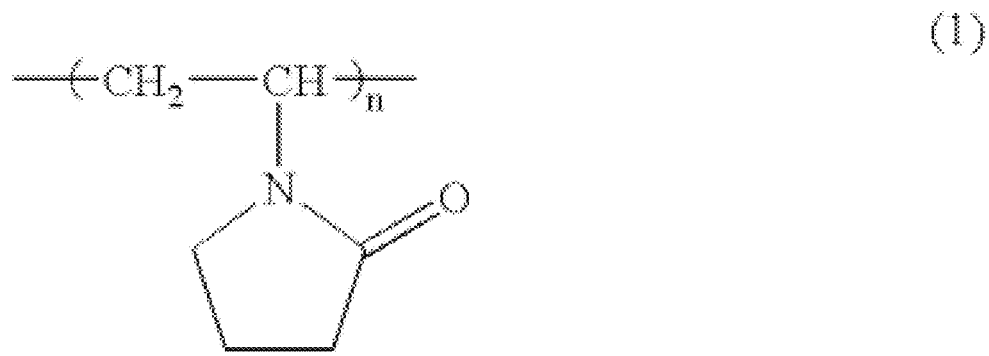

With respect to the variation that uses ionic bonding, the secondary polymers are hydrocarbon polymers having functional groups that can accept a proton (e.g., amino or inimine-containing polymers). Therefore, in this ionic bonding class, hydrocarbon polymers acquire a cation charge in a typical ink solution with pH(e)<2. This is achieved when the basic functional group has a pKa>5. A particularly useful secondary polymer that interacts with the primary polymer via ionic bonding is a high molecular-weight polyvinyl-2-pyrrolidone (PVP). A structure for PVP is provide in FIG. 3D where n is 5000 to 15000 on average. A particularly useful weight average molecular weight for the PVP is about 1000 kDa. Specific additional examples for the second polymer that interacts by ionic bonding include, but are not limited to, polyamides, polyamides-amines, poly(2-ethyl-2-oxazoline), poly(alkyl- and/or aryl-substituted oxazolines), poly(hydroxyalkyl acrylates), poly(hydroxyalkyl methacrylates), poly(hydroxyalkylethyleneimines), polyacrylamides, poly(dimethylaminoalkyl acrylates), poly(dimethylaminoalkyl methacrylates), poly(diallyldimethyl ammonium chloride), poly(aminophosphazenes), poly(alkylaminophosphazenes), and combinations thereof. In some refinements, secondary polymers that interact with ionic bonding are characterized by having a high weight average molecular weight. In particular, the weight average molecular weight of the secondary polymer in this variation is equal to or greater than or equal to in increasing order of preference, 400 kDa, 500 kDa, 600 kDa, or 700 kDa. In a further refinement, the weight average molecular weight of the secondary polymer is equal to or less than or equal to in increasing order of preference, 1200 kDa, 1100 kDa, 1000 kDa, or 800 kDa. In some refinements, the equivalent weight of the secondary polymer that uses ionic bonding is from about 50 to 500 g/mol. In other refinements, the equivalent weight of the secondary polymer that uses ionic bonding is from about 100 to 300 g/mol.

The primary ionomer and secondary polymer are characterized by their respective intrinsic viscosity and overlap concentration which measure the chain expansion in solution. For a spherical particle in suspension or polymer chain conformation in solution, the Einstein equation (1) gives the solution viscosity ($\eta$) in dilute concentration at a given solvent viscosity ($\eta_s$) and volume fraction ($\phi$). A more expanded chain conformation increases the volume fraction occupied by the polymer ($\phi$) which in turn increases the solution viscosity ($\eta$).

$$\frac{\eta - \eta_s}{\eta_s} = 2.5\varphi \quad (1)$$

The dilute-semidilute transition[11,12] occurs at the overlap concentration (c*) where the polymer chains just touch one another in solution. For uncharged polymers, the intrinsic viscosity [$\eta$] converges to a plateau value with decreasing concentration; $c^*_{uncharged}$ is then simply determined in equation (2) by the reciprocal of [$\eta$] where $\eta_{sp}$=specific viscosity.

$$\lim_{c \to 0} \frac{\eta - \eta_s}{\eta_s c} = \lim_{c \to 0} \frac{\eta_{sp}}{c} = [\eta] \quad (1)$$

$$c^*_{uncharged} = \frac{1}{[\eta]} \quad (2)$$

In contrast, ionic polymer chains continue to change their solution conformation below the dilute limit or in the presence of free salt due counter-ion screening of the native charge density along its backbone. As a result, the chain expansion for ionic polymers is measured by intrinsic viscosity at a consistent free salt concentration that is above the ionic monomer concentration in solution or by overlap concentration in the absence of any free salt concentration.

The intrinsic viscosity for commercially available PFSA ionomers is compared in Table 1 to their respective equivalent and weight-average molecular weights. The SEC method[10] measured an ionomer solution that was autoclaved at 230° C. in 0.1% w/w in n-propanol(nPrOH):water($H_2O$): 4:1 w/w solvent, diluted to 0.075% w/w with dimethylformamide (DMF) addition and then concentrated with a slow $N_2$ dry to 0.20% w/w. The eluent solvent was DMF with 100 mM $LiNO_3$ salt which is significantly higher than the ionic monomer concentration (1-2 mM) in solution.

Figure 4:
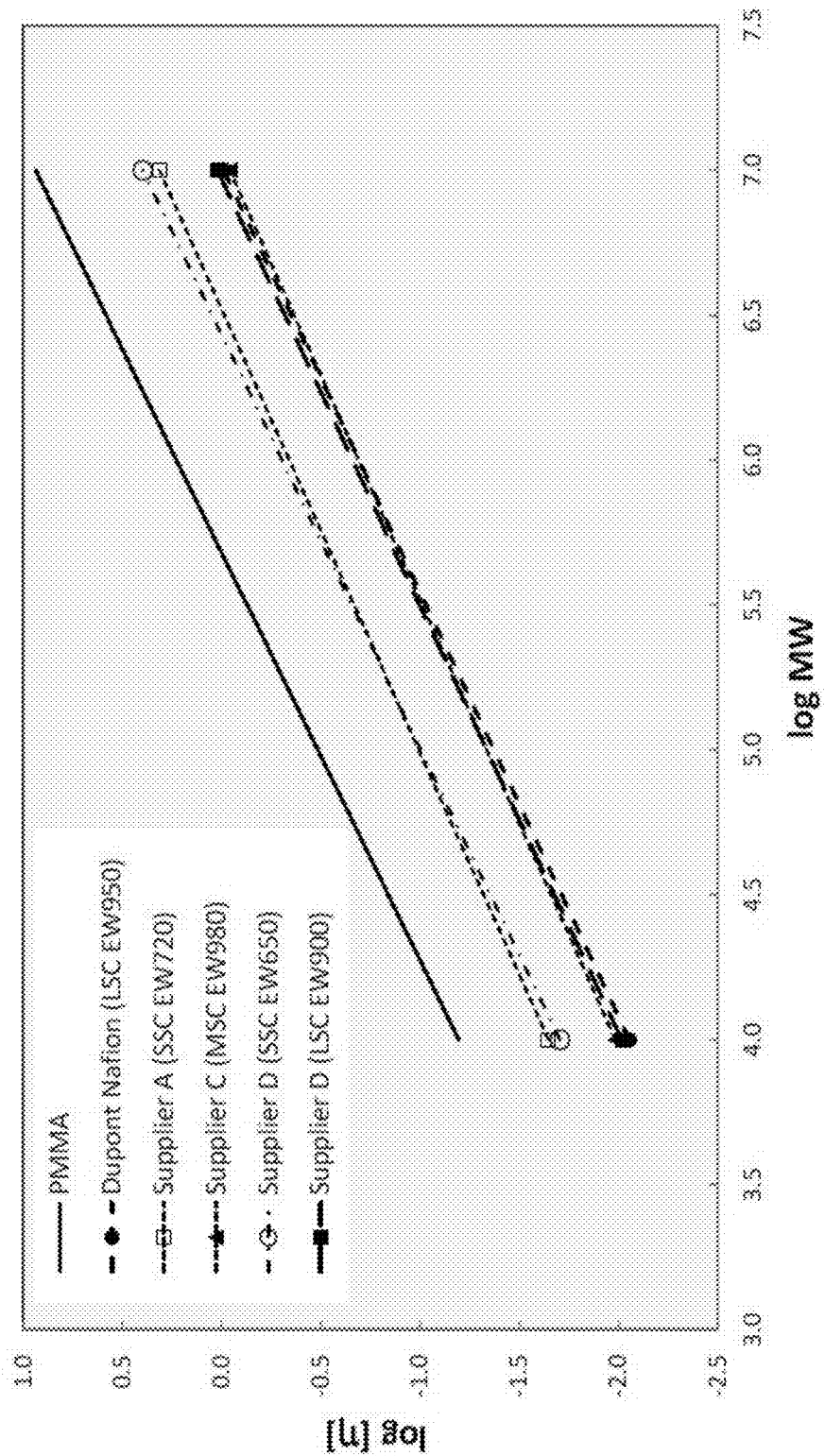
FIG. 4 plots the log-log dependence of intrinsic viscosity on molecular weight where a consistent Mark-Houwink exponent is measured across the commercially available PFSA ionomer structures.

FIG. 4 shows the dependence of ionomer intrinsic viscosity on molecular weight in nPrOH:$H_2O$:DMF solvent with 100 mM $LiNO_3$. The Mark-Houwink equation (3) describes the intrinsic viscosity dependence for a polymer solution with molecular weight (M). The exponent ($a_{M-H}$) ranges between 0.5 (theta limit or poor solvent quality) to 0.8 (good solvent quality) for flexible polymers. All commercial PFSA ionomers in Table 1 show a consistent $a_{M-H}$=0.70 which enables a simple prediction of the molecular weight impact on ionomer chain expansion.

$$[\eta] = K^* M^a \quad (3)$$

Figure 5A:
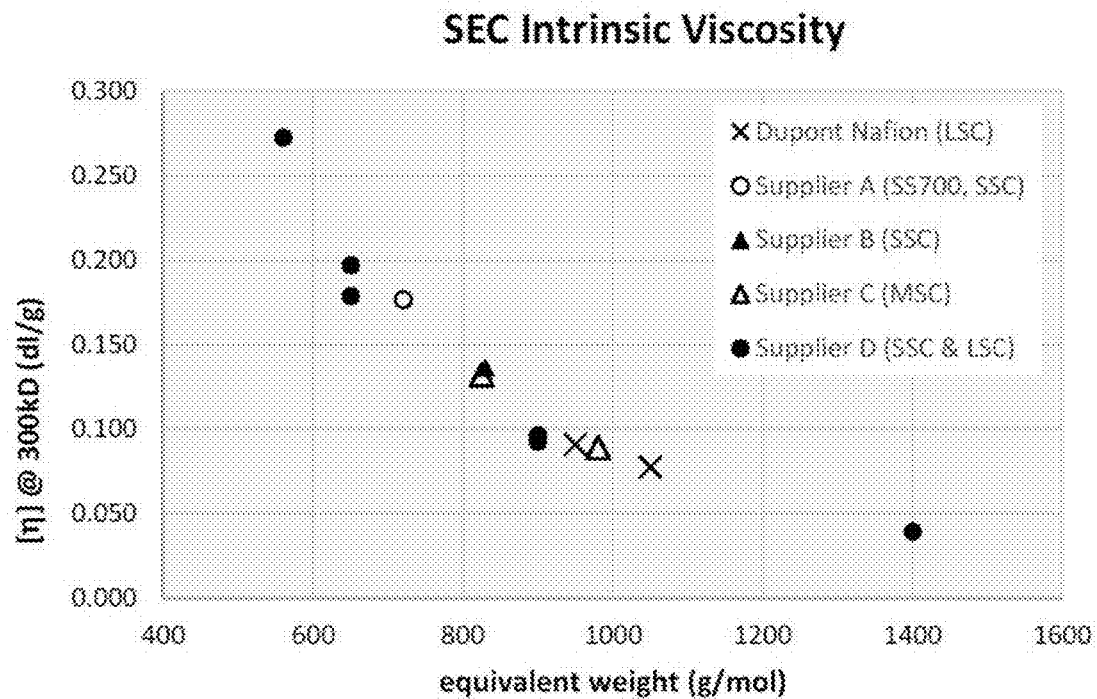
FIG. 5A plots a universal curve for the dependence of the normalized intrinsic viscosity on equivalent weight which is independent of the specific side-chain structure of the sulfonate monomer.
Figure 5B:
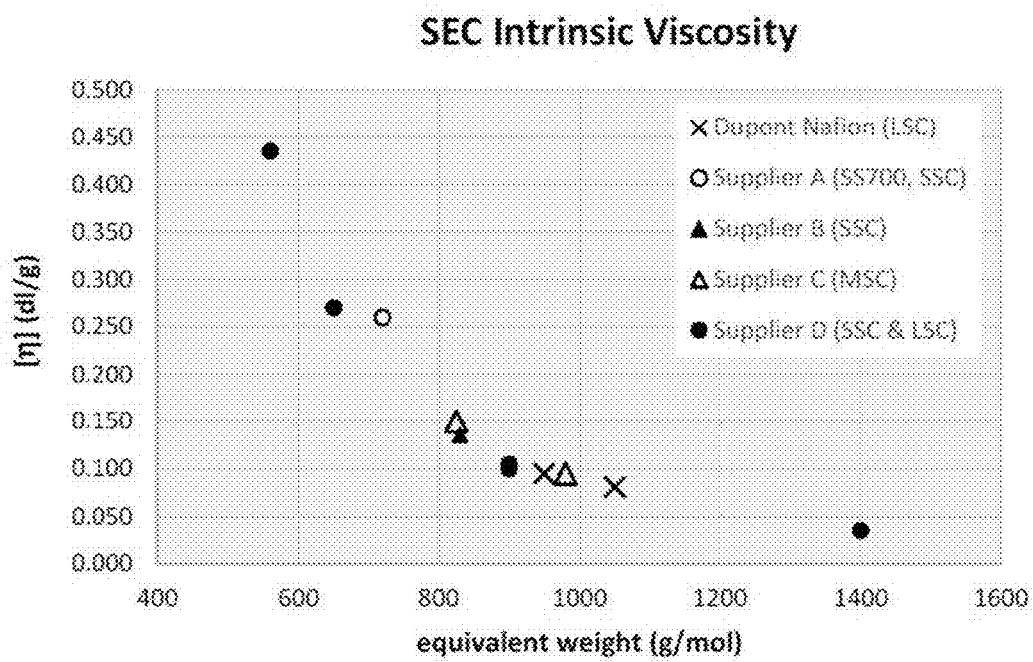
FIG. 5B plots a universal curve for as-received ionomer with increasing $M_w$ at lower EW for the dependence of measured intrinsic viscosity on equivalent weight which is independent of the specific side-chain structure of the sulfonate monomer.

Similarly, FIG. 5 shows the dependence of ionomer intrinsic viscosity on equivalent weight in the SEC solvent system. In this case, there is a single universal curve to predict the equivalent weight impact on ionomer chain expansion.

The overlap concentration for ionic polymers is also measured in the absence of free salt that reduces the counter-ion screening of the native charge density along its backbone. This represents a limiting case that more closely approximates the native ionomer chain expansion in an electrode ink since the free salt concentration is typically far below the ionic monomer concentration. The overlap concentration (c*) is measured in a dilution series when the solution viscosity just doubles the native solvent viscosity ($\eta_s$).

$$\eta(c^*_{charged}) = 2^*\eta_s \quad (4)$$

Table 2 shows the relative chain expansion for the SS700 (EW720) vs NAFION® (EW950) ionomer in $H_2O$ vs ethanol(EtOH):$H_2O$:1:1 w/w solution. The ionomer chains are compressed in poor solvent (water-only) as indicated by an overlap concentration at 2-3% w/w solution. However, the SS700 ionomer opens significantly more than the Nafion® ionomer in EtOH:$H_2O$:1:1 w/w solvent as indicated by overlap concentrations of 0.060 vs 0.63% w/w solution, respectively. The relative chain expansion between the two ionomer types is 4-fold higher in the overlap vs the intrinsic viscosity measurement due to counter-ion screening of the free salt present in the latter case.

TABLE 2

Ionomer chain expansion

| ionomer | EW | SEC [$\eta$] | c** (w/w solution) | |
|---|---|---|---|---|
| (type) | (g/mol) | (dl/g) | ($H_2O$) | (EtOH:H2O::1:1) |
| LSC (NAFION ®) | 950 | 0.095 | 2.7% | 0.63% |
| SSC (SS700) | 720 | 0.260 | 2.1% | 0.060% |

TABLE 1

Ionomer properties

| company | side-chain (type) | product (type) | EW (g/mol) | $M_w$ (kD) | side-chain (mol %) | n:m (mol/mol) | p (#) | m (#) | SEC[$\eta$] (dl/g) | SEC[$\eta$] (300 kD, dl/g) |
|---|---|---|---|---|---|---|---|---|---|---|
| Dupont | LSC (NAFION ®) | D2021 | 1050 | 320 | 16.5% | 6.1 | 1 | 1 | 0.081 | 0.077 |
| Dupont | LSC (NAFION ®) | D2020 | 950 | 320 | 16.5% | 5.1 | 1 | 1 | 0.095 | 0.091 |
| Supplier A | SSC | SS700 | 720 | 520 | 19.2% | 4.4 | 0 | 1 | 0.260 | 0.177 |
| Supplier B | SSC | D83-20 | 830 | 520 | 15.3% | 5.5 | 0 | 1 | 0.200 | 0.136 |
| Supplier C | MSC | — | 825 | 360 | 18.3% | 4.5 | 0 | 1 | 0.150 | 0.132 |
| Supplier C | MSC | — | 980 | 330 | 14.3% | 6.0 | 0 | 1 | 0.095 | 0.089 |

In a variation, for the system using hydrogen bonding, the primary polymer is long side-chain polymer having an equivalent weight from 850 to 1050 g/mol and a weight average molecular weight from 250 to 500 kDa. In a refinement, the secondary polymer is a short side chain polymer having an equivalent weight from 500 to 850 g/mol and a weight average molecular weight from 300 to 2000 kDa. In a refinement, the secondary polymer is a longside chain polymer having an equivalent weight from 550 to 850 g/mol and a weight average molecular weight from 500 to 1500 kDa.

In a variation of the present embodiment, the secondary polymer requires a significantly higher intrinsic viscosity or, equivalently, a lower overlap concentration than the primary ionomer. Typically, the secondary polymer has an overlap concentration that is at least 3 times lower than the overlap concentration of the primary polymer. If the secondary polymer has a PFSA chemical structure, the equivalent and molecular weight are chosen in combination to reach this threshold overlap concentration.

In another refinement, the secondary polymer has an overlap concentration that is at least 5 times lower than the overlap concentration of the primary polymer. In still another refinement, the secondary polymer has an overlap concentration that is at least 10 times lower than the overlap concentration of the primary polymer. In further refinements, the secondary polymer has an overlap concentration that is at most 15 to 20 times lower than the overlap concentration of the primary polymer. In some refinements, the secondary polymer has an overlap concentration that is from 5 to 20 times lower than the overlap concentration of the primary polymer. Although the relationship regarding the overlap concentration is applicable to both variations of the secondary polymer (i.e. ionic bonding and hydrogen bonding), it is most useful for the examples that use hydrogen bonding.

The following examples illustrate the various embodiments of the present invention. Those skilled in the art will recognize many variations that are within the spirit of the present invention and scope of the claims.

An electrode ink is prepared using 30% PtCo alloy catalyst nanoparticle supported on Ketjen Black and is dispersed in n-propanol-water solvent (nPrOH:$H_2O$:3:1 w/w) with NAFION® as the primary ionomer. This represents a typical cathode ink composition for PEFC cell fabrication. The ink is then coated directly on commercial diffusion media (catalyst-coated-diffusion-media, CCDM) whereby an uneven permeation of the ionomer solution into its porous structure can occur.

Figure 6:
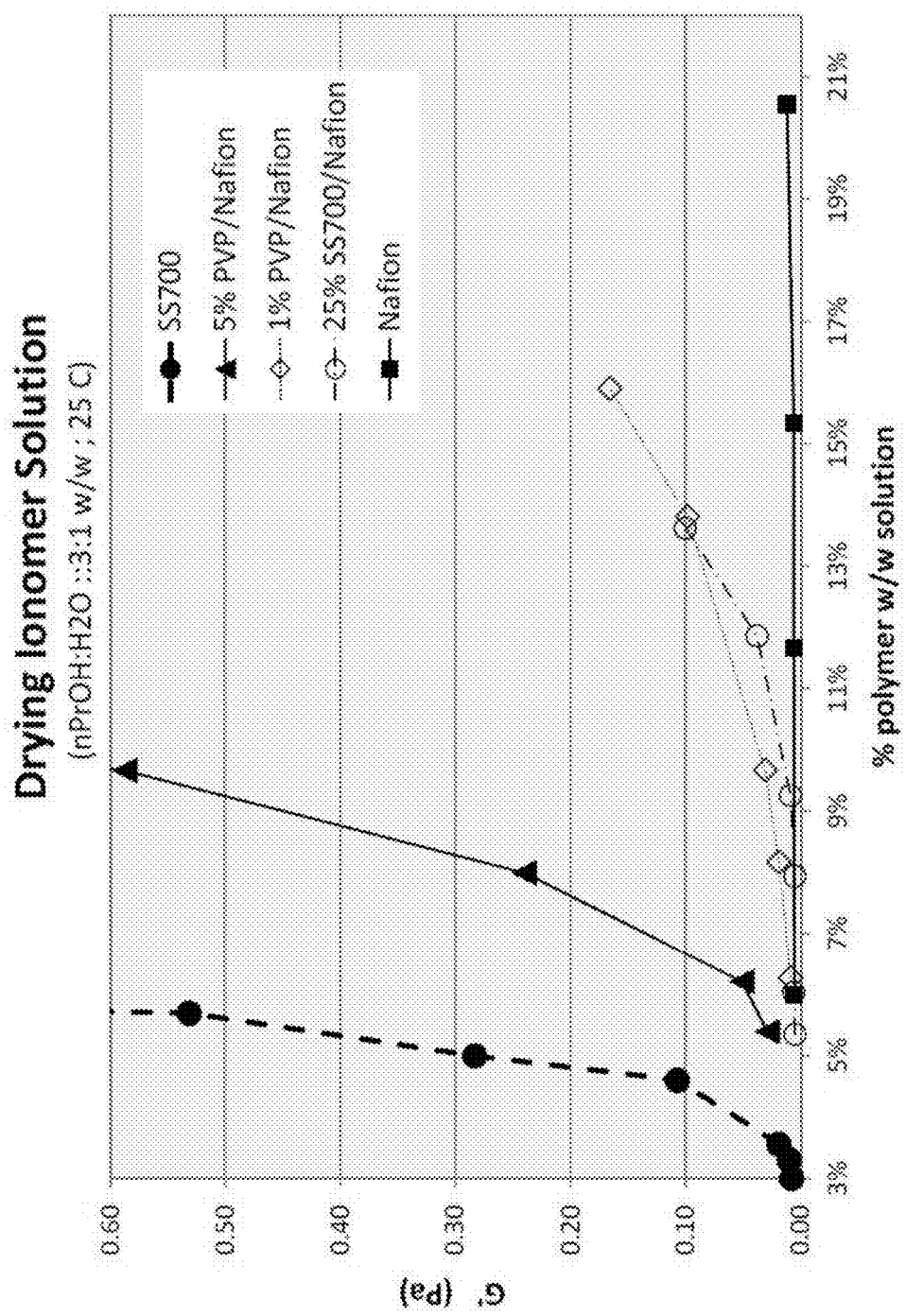
FIG. 6 plots the elastic modulus growth (G') for drying NAFION® ionomer solutions. The rheometer used a 60 mm cone-plate geometry (Ti, 1°) at 0.2 Pa stress amplitude, 0.5 Hz and a 100 sec time-average.

FIG. 6 shows the relative growth in the solid-like or elastic modulus (G') of four NAFION® ionomer solutions during solvent evaporation at 25° C. The comparative example uses only NAFION® ionomer formulated at 5.0% w/w solution in nPrOH:$H_2O$:3:1 w/w. This primary ionomer solution does not show any increase in the solution elastic modulus up to the last measurement at 20% solids, while both preferred embodiments show an increasing solid-like modulus that reaches 0.20 Pa at 16% solids. These embodiments blend either the secondary PFSA SSC ionomer or PVP polycation, while the initial polymer concentration is maintained at 5.0% w/w solution.

In the ionic bonding variation, PVP homopolymer has a very low equivalent weight at 110 g/mol coupled with a high $M_w$ at 960 kD. Since this secondary polymer is highly charged by the available PFSA ionomer present in a typical electrode ink, the polycation chain extends in solution and associates strongly with the NAFION® polyanion through ionic bonding of the ammonium and sulfonate sites on each polymer.

The NAFION®:SS700 PFSA ionomer blend is formulated at 3:1 w/w where H-bonding of the more accessible sulfonic acid groups on the SSC ionomer is responsible for the more rapid growth in the solid-like modulus with solvent evaporation. The ionic coupling with the extended PVP polymer shows even stronger growth in elastic modulus at the lower relative loading of 1 or 5% w/w NAFION®.

Figure 7:
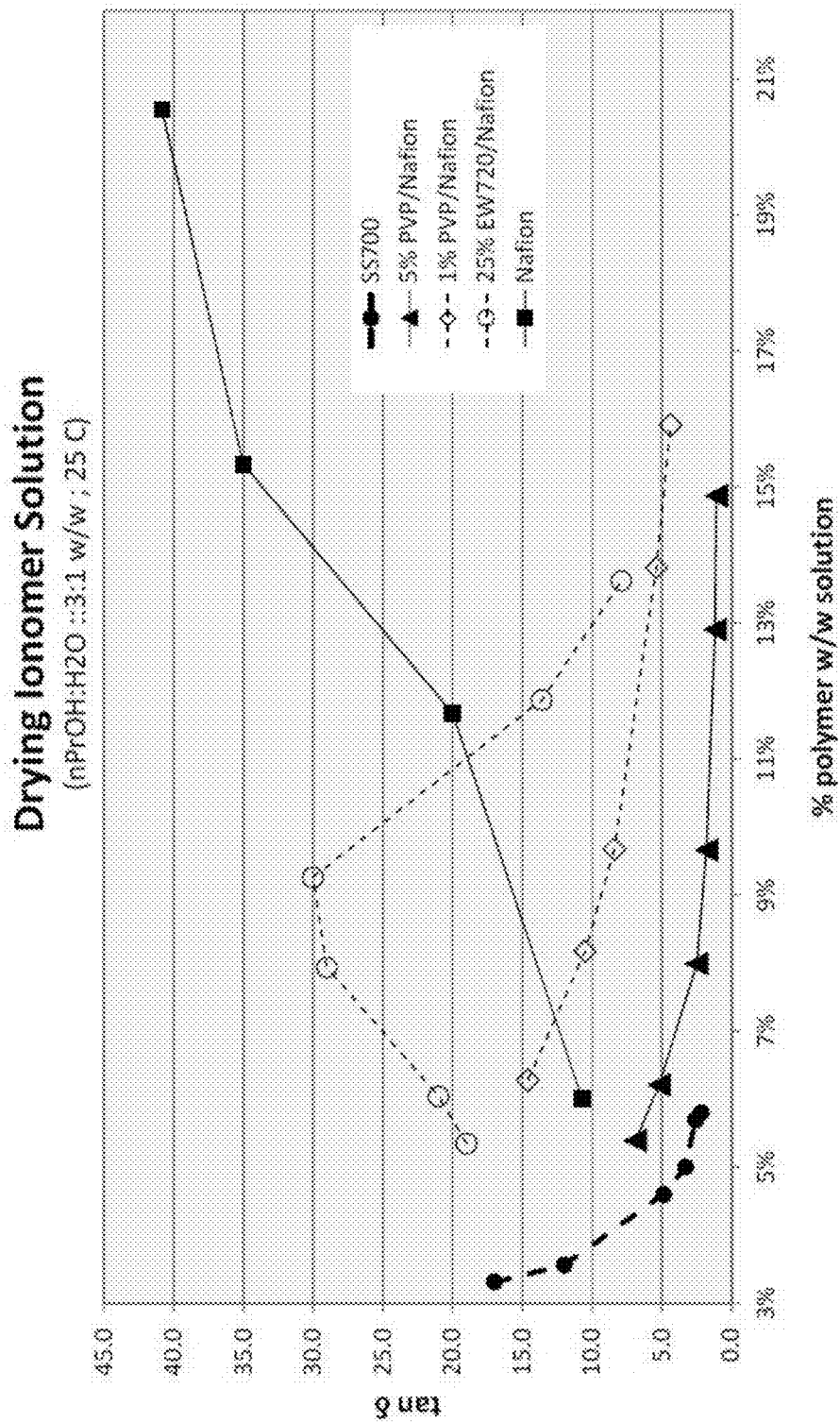
FIG. 7 plots Tan δ (or G"/G') for the drying NAFION® ionomer solutions.

The consolidation or gel point of the ink ionomer solution occurs when the elastic (G') modulus reaches and then crosses the viscous (G") modulus. FIG. 7 plots tan δ (or G"/G') for the same four NAFION® solutions during solvent evaporation. The elastic modulus is minimal at the onset of solvent evaporation as reflected by the measured G"/G'>7 since the polymer solutions are more liquid-than solid-like at this stage in the solvent drying process.

The comparative example with only NAFION® primary ionomer present in the ink solution actually shows a further increase in tan δ with solvent evaporation. That is to say, the viscous modulus continues to increase with primary ionomer concentration, but the elastic modulus does not as shown in FIG. 6. On the other hand, the preferred embodiments which blend the more expanded SS700 ionomer or a more extended PVP polycation chain with NAFION® ionomer do show a significantly decreasing tan δ that approaches a consolidation point (G"/G'=1) for the polymer solution with solvent drying.

The PtCo alloy catalyst ink is coated directly on commercially available diffusion media (catalyst-coating-on-diffusion-media, CCDM). For the comparative example, the ink NAFION®/carbon ratio is formulated at I/C=1.40), is applied with a Mayer rod to achieve an aim laydown of 0.20 mg Pt and 0.48 mg carbon/$cm^2$ which is then dried under an IR lamp at 60° C. The CCDM ink I/C is intentionally formulated above the optimized cathode performance (near I/C=1.00) due to permeation of the ink solution into the porous substrate. The resulting electrode thickness is measured at ~16 mm which implies ~70% v/v porosity.

Table 3 shows the calculated composition of the applied ink film at three stages in the drying process: namely, after permeation of the ink solution into the porous coating substrate, at solvent saturation of the consolidated carbon microstructure and after completion of the solvent dry process.

TABLE 3

| Ink Compositions | | | | | |
|---|---|---|---|---|---|
| electrode composition | | | | | |
|  | wet w/w | dry v/v | electrode ink solution @ saturation | | |
| Ketjet black | 5.0% | 14.7% | solvent density = | 0.854 | g/cc |
| PtCo | 2.3% | 0.7% | ionomer loading = | 29.7% | w/w |
| NAFION ® | 7.0% | 20.6% | solvent loading = | 39.4% | w/w |
| solvent | 85.7% | 0.0% | H2O w/w solvent = | 36.0% | w/w |
| void | 0.0% | 64.0% | nPrOH w/w solvent = | 64.0% | w/w |

After permeation of the applied ink solution into the diffusion media substrate, ~30% ionomer solution is removed from the wet electrode layer which increases the carbon loading from 3.00% to 4.13% w/w ink. At saturation, the remaining ionomer solution just fills the consolidated carbon microstructure whereby the ionomer loading reaches ~25% w/w ink with ~85% solvent loss at this stage. The mechanical reinforcement of a gelling ionomer solution is required at or just prior to this point in the electrode drying process to avoid fracture of the fragile carbon microstructure.

Figure 8:
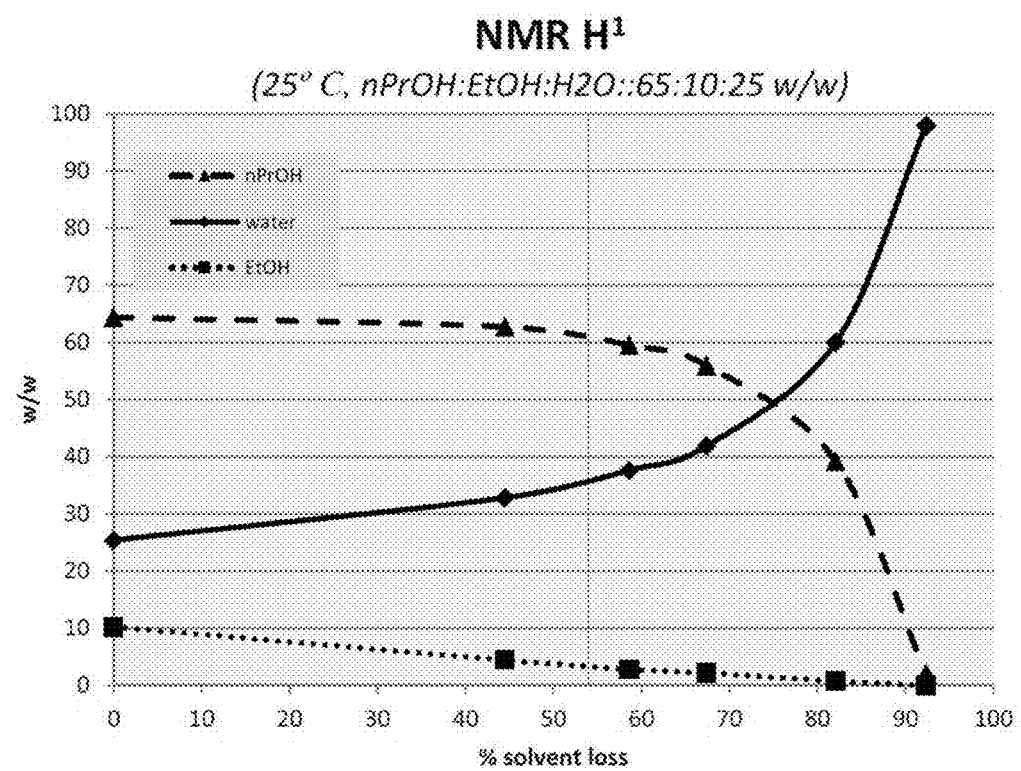
FIG. 8. The alcohol-water composition for a 6.0% NAFION® solution is followed with proton NMR during solvent drying.

The water fraction of the ink solution also increases at saturation due to the higher vapor pressure for the nPrOH solvent which drives a higher tensile stress associated with the higher liquid surface tension. The $H^1$ NMR plot in FIG. 8 shows an increase from 25 to ~55% w/w solvent at carbon consolidation.

Figure 9A:
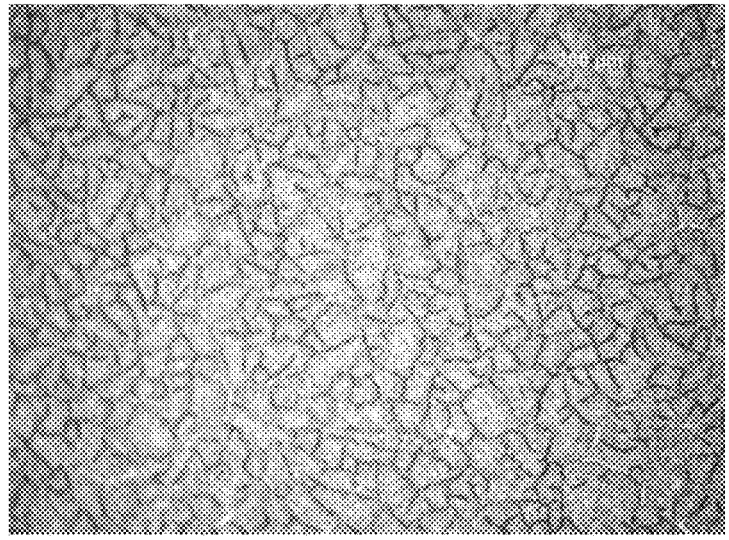
FIGS. 9A and 9B. Reflected light micrographs show the substantial reduction in CCDM electrode cracking at the same dry thickness (16 μm) after blending the primary NAFION® ionomer with PVP polymer or SS700 ionomer in the electrode ink solution. A. I(NAFION®)/C=1.4 B. NAFION® blended with 2% PVP polymer or 25% SS700 ionomer.
Figure 9B:
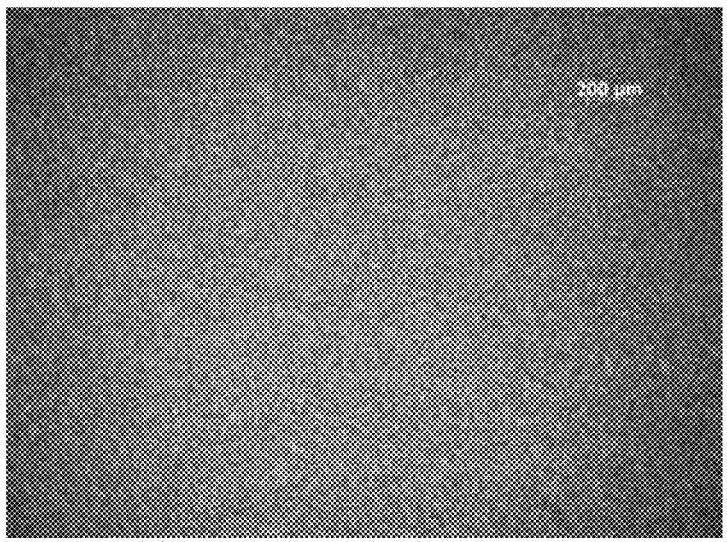

FIG. 9 shows ionomer consolidation can only occur before the carbon consolidation of the electrode ink if either aSS700 PFSA ionomer or a PVP polycation is blended with the NAFION® primary ionomer in the ink solution. The growth of elastic modulus in FIG. 7 is only observed for the preferred ink solutions (16% polymer) before carbon consolidation (25% polymer or carbon solids).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments, variations, and refinements may be combined to form further embodiments of the invention.

What is claimed is:

1. An electrode ink composition comprising:
   a solvent;
   a platinum group metal-containing catalyst composition dispersed in the solvent;
   a primary polymer dispersed within the solvent, the primary polymer being an ionomer; and
   a secondary polymer dispersed within the solvent, the secondary polymer interacting with the primary polymer via ionic bonding;
   wherein the primary polymer is described by formulae I or II:

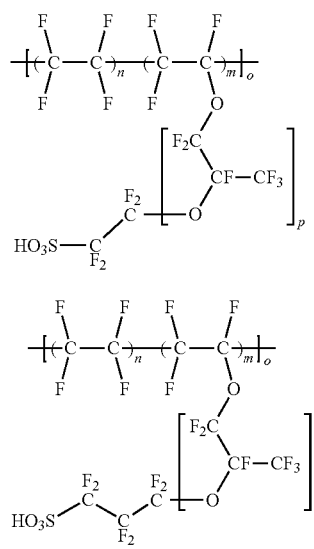

in which n is 1 to 10; m is 1, 2, or 3; o is 30 to 800; and p is 1, 2, or 3;
wherein the secondary polymer is a high molecular-weight polyvinyl-2-pyrrolidone having a weight average molecular weight greater than or equal to 400 kDa, and wherein the primary polymer and the secondary polymer are each independently present in an amount ranging from 1 weight percent to 20 weight percent based on a total weight of the electrode ink composition.

2. The electrode ink composition of claim 1 wherein the platinum group metal-containing catalyst composition includes platinum or a platinum alloy disposed on support particles.

3. The electrode ink composition of claim 1 wherein the secondary polymer has an overlap concentration that is from 5 times to 20 times lower than an overlap concentration of the primary polymer.

4. A fuel cell comprising:
   an anode catalyst layer;
   a cathode catalyst layer;
   an ion conducting membrane interposed between anode catalyst layer and cathode catalyst layer;
   a first gas diffusion layer is disposed over anode catalyst layer;
   a second gas diffusion layer is disposed over the cathode catalyst layer;
   an anode flow field plate is disposed over the first gas diffusion layer; and
   a cathode flow field plate is disposed over the second gas diffusion layer, wherein at least one of the anode catalyst layer or the cathode catalyst layer include a platinum group metal-containing catalyst composition, a primary polymer that is an ionomer, and a secondary polymer, the secondary polymer interacting with the primary polymer via a non-covalent interaction when the primary polymer and the secondary polymer are dispersed in a solvent;
   wherein the primary polymer is described by formulae I or II:

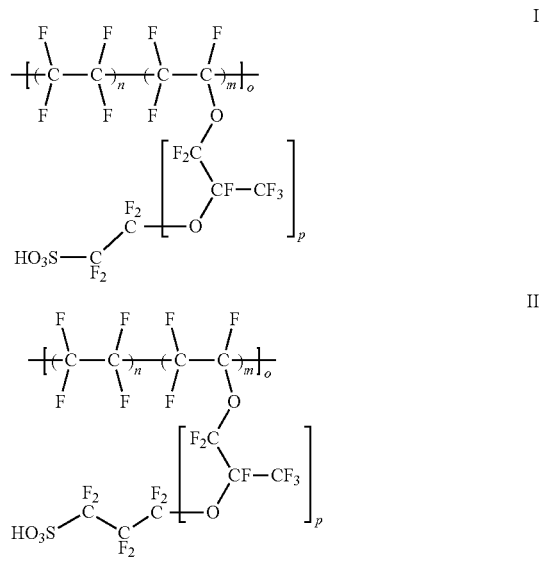

in which n is 1 to 10; m is 1, 2, or 3; o is 30 to 800; and p is 1, 2, or 3; and wherein the secondary polymer has an overlap concentration that is from 5 to 20 times lower than an overlap concentration of the primary polymer.

5. The fuel cell of claim 4 wherein the platinum group metal-containing catalyst composition includes platinum or a platinum alloy disposed on support particles.

6. The fuel cell of claim 4 wherein the secondary polymer is described by formula III:

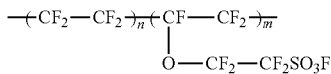

III wherein:
n is 1 to 10; and
m is 1, 2 or 3.

7. The fuel cell of claim 4 wherein the primary polymer is long side-chain polymer having an equivalent weight from 850 to 1050 g/mol and a weight average molecular weight from 250 to 500 kDa and the secondary polymer is a short side chain polymer having an equivalent weight from 500 to 850 g/mol and a weight average molecular weight from 300 to 2000 kDa or a long side chain polymer having an equivalent weight from 550 to 850 g/mol and a weight average molecular weight from 500 to 1500 kDa.

8. The fuel cell of claim 4 wherein the secondary polymer is a high molecular-weight polyvinyl-2-pyrrolidone having a weight average molecular weight greater than or equal to 400 kDa.

9. The fuel cell of claim 4 wherein the secondary polymer is selected from the group consisting of polyamides, polyamides-amines, poly(2-ethyl-2-oxazoline), poly(alkyl- and/or aryl-substituted oxazolines), poly(hydroxyalkyl acrylates), poly(hydroxyalkyl methacrylates), poly(hydroxyalkylethyleneimines), polyacrylamides, poly(dimethylaminoalkyl acrylates), poly(dimethylaminoalkyl methacrylates), poly(diallyldimethyl ammonium chloride), poly(aminophosphazenes), poly(alkylaminophosphazenes), and combinations thereof.

10. The fuel cell set forth in claim 4, wherein the primary polymer and the secondary polymer are each independently present in an amount ranging from 1 weight percent to 20 weight percent based on a total weight of the platinum group metal-containing catalyst composition.

* * * * *